United States Patent
Potter et al.

(10) Patent No.: US 7,484,443 B2
(45) Date of Patent: Feb. 3, 2009

(54) PRECISION TURNING PROCESS FOR HATTED BRAKE ROTOR

(75) Inventors: Michael F. Potter, New Lothrup, MI (US); Gary D. Bruff, Chesaning, MI (US); Chiung A. Lee, Centerville, OH (US); Youji Ma, Ann Arbor, MI (US); Randy Wolin, Ontario (CA)

(73) Assignee: Delphi Technologies, Inc., Troy, MI (US)

( * ) Notice: Subject to any disclaimer, the term of this patent is extended or adjusted under 35 U.S.C. 154(b) by 921 days.

(21) Appl. No.: 10/971,835

(22) Filed: Oct. 22, 2004

(65) Prior Publication Data
US 2005/0086808 A1    Apr. 28, 2005

Related U.S. Application Data

(60) Provisional application No. 60/514,376, filed on Oct. 24, 2003.

(51) Int. Cl.
B23B 5/04    (2006.01)
B23B 3/00    (2006.01)

(52) U.S. Cl. .......................................... 82/1.11; 82/112

(58) Field of Classification Search .................. 82/112, 82/1.11; 29/894.361; 451/424
See application file for complete search history.

(56) References Cited

U.S. PATENT DOCUMENTS

| | | | |
|---|---|---|---|
| 3,182,428 A | 5/1965 | Hannon | |
| 4,827,677 A | 5/1989 | Schmitz | |
| 5,056,266 A | 10/1991 | Norris | |
| 5,125,187 A * | 6/1992 | Thiem | 451/63 |
| 5,430,926 A | 7/1995 | Hartford | |
| 5,480,007 A | 1/1996 | Hartford | |
| 5,842,388 A * | 12/1998 | Visser et al. | 82/1.11 |
| 5,878,479 A | 3/1999 | Dickerson et al. | |
| 5,899,305 A | 5/1999 | Austin et al. | |
| 5,915,502 A | 6/1999 | Rapisardi et al. | |
| 5,915,747 A | 6/1999 | Dickerson et al. | |
| 5,937,499 A | 8/1999 | Austin et al. | |
| 5,988,761 A * | 11/1999 | Visser et al. | 301/6.1 |
| 6,067,857 A | 5/2000 | Cooper et al. | |
| 6,112,398 A | 9/2000 | Messina | |
| 6,131,707 A | 10/2000 | Buechel et al. | |
| 6,142,267 A | 11/2000 | Sporzynski et al. | |
| 6,158,124 A | 12/2000 | Austin | |
| 6,247,219 B1 | 6/2001 | Austin et al. | |
| 6,279,697 B1 | 8/2001 | Dickerson et al. | |
| 6,306,340 B1 | 10/2001 | Seifrit, Jr. et al. | |
| 6,338,273 B1 | 1/2002 | Warkotsch | |
| 6,575,030 B1 | 6/2003 | Lauf et al. | |

(Continued)

Primary Examiner—Willmon Fridie
(74) Attorney, Agent, or Firm—Thomas N. Twomey

(57) ABSTRACT

The invention provides a method including the steps of fixedly securing a brake rotor with a first rotatable fixture. The brake rotor includes a hat and a pair of plates, an inboard plate and an outboard plate. The method also includes the step of rough-cutting a plurality of surfaces of the brake rotor while the brake rotor is fixedly secured to the first rotatable fixture. The rough-cutting operations can be performed with one or more cutting tools. The method also includes the step of finishing the plurality of surfaces while the brake rotor is fixedly secured to the first rotatable fixture. The brake rotor can be completely processed, with respect to cutting operations at least, at a single workstation while supported by a single rotatable fixture.

3 Claims, 2 Drawing Sheets

U.S. PATENT DOCUMENTS

| | | |
|---|---|---|
| 6,598,716 B1 | 7/2003 | Ihm |
| 6,601,485 B2 | 8/2003 | Baldwin et al. |
| 6,619,163 B2 | 9/2003 | Tanio et al. |
| 6,708,589 B2 * | 3/2004 | Brinker et al. ............... 82/1.11 |
| 2001/0020321 A1 | 9/2001 | Tanio et al. |
| 2002/0174752 A1 | 11/2002 | Baldwin et al. |

* cited by examiner

US 7,484,443 B2

PRECISION TURNING PROCESS FOR HATTED BRAKE ROTOR

CROSS REFERENCE TO RELATED APPLICATIONS

This application claims the benefit of U.S. provisional patent application Ser. No. 60/514,376 for a PRECISION TURNING PROCESS FOR HATTED BRAKE ROTOR, filed on Oct. 24, 2003, which is hereby incorporated by reference in its entirety. This claim is made under 35 U.S.C. § 119(e); 37 C.F.R. § 1.78; and 65 Fed. Reg. 50093.

FIELD OF THE INVENTION

The invention relates to a turning process for a rotor of a vehicle braking system.

BACKGROUND OF THE INVENTION

Previous methods for turning hatted rotors are not as efficient as desired. In particular, the prior art methods for processing a hatted brake rotor involve a plurality of work stations and numerous machining operations. Several machining operations can be performed at each work station.

Numerous brake rotors are processed annually and a reduction in the number of work stations and/or the number of processing steps would be a significant improvement.

SUMMARY OF THE INVENTION AND ADVANTAGES

The invention provides a method including the steps of fixedly securing a brake rotor with a first rotatable fixture. The brake rotor includes a hat and a pair of plates, an inboard plate and an outboard plate. The method also includes the step of rough-cutting a plurality of surfaces of the brake rotor while the brake rotor is fixedly secured to the first rotatable fixture. The rough-cutting operations can be performed with one or more cutting tools. The method also includes the step of finishing the plurality of surfaces while the brake rotor is fixedly secured to the first rotatable fixture. The brake rotor can be completely processed, with respect to cutting operations at least, at a single workstation while supported by a single rotatable fixture.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
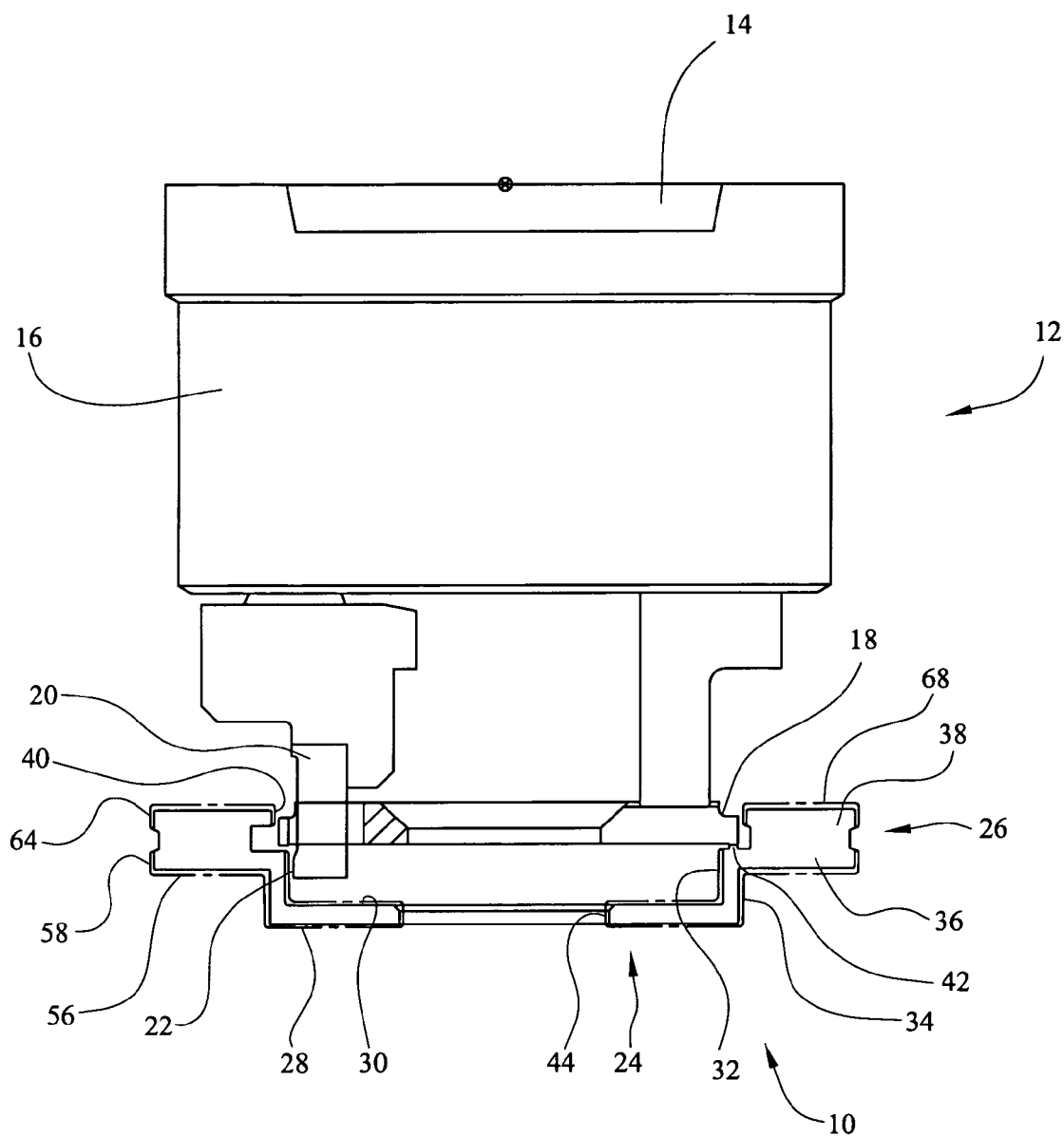
FIG. 1 is a schematic illustration of a hatted brake rotor engaged with tooling, wherein the tooling supports the rotor during processing according to the exemplary embodiment of the present inventive method.

Referring now to FIG. 1, a brake rotor 10 is supported by tooling 12 in the exemplary embodiment of the invention. The tooling or fixture 12 includes a rotatable spindle 14 operably associated with a base 16. For example, the spindle 14 can rotate the base 16. The base 16 supports a locating ring 18 and jaws 20. FIG. 1 shows only one jaw 20, however, the base 16 can support a plurality of jaws 20 for engaging the rotor 10 at a plurality of locations. Each of the jaws 20 includes an insert 22 for enhancing engagement between the jaws 20 and the rotor 10.

The rotor 10 includes a hat portion 24 and a plate portion 26. The hat portion 24 defines a wheel mounting surface 28, a bearing mounting surface 30, a hat inner diameter surface 32, and a hat outer diameter surface 34. The wheel mounting surface 28 engages a vehicle when the rotor 10 is assembled with respect to the vehicle. The bearing mounting surface 30 engages a bearing that supports rotation of a vehicle's wheels. The bearing (not shown) is received in the hat inner diameter surface 32. The hat inner diameter surface 32 is cast to receive the bearing and, in the exemplary embodiment of the invention, is not machined. The inserts 22 of the jaws 20 engage the rotor 10 along the hat inner diameter surface 32. The hat portion 24 also defines an aperture or pilot aperture 44 centrally disposed with respect to the bearing mounting surface 30 and the wheel mounting surface 28.

The plate portion 26 includes an outboard plate 36 and an inboard plate 38. The outboard and inboard plates 36, 38 define outer surfaces 56, 68 that engage the brake shoes of the vehicle. The inboard plate 38 defines an inboard plate inner diameter surface 40 and an outer diameter surface 64. The outboard plate 36 defines an outer diameter surface 58 and is generally disposed between the hat portion 24 and the inboard plate 38.

The rotor 10 also defines a plurality of locating tabs 42 generally disposed between the hat portion 24 and the plate portion 26 adjacent the hat inner diameter surface 32. The tabs 42 project axially from the hat portion 24 in the direction of the inboard plate 38. The locating ring 18 engages the plurality of locating tabs 42 to locate the tooling 12 with respect to the rotor 10.

Figure 2:
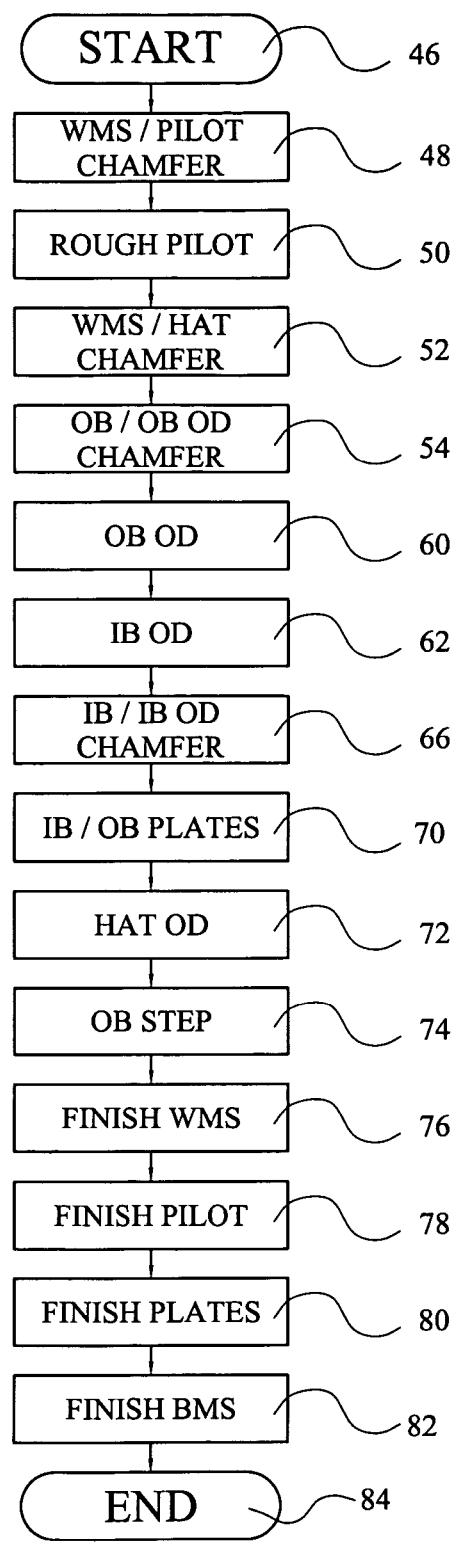
FIG. 2 is a simplified flow diagram illustrating the steps performed in the exemplary embodiment of the inventive method.

The process according to the exemplary embodiment of the invention is illustrated in the simplified flow diagram of FIG. 2. The process begins at step 46. At step 48, a chamfer is formed between the pilot aperture 44 and the wheel mounting surface 28. At step 50, a rough cut is made with respect to the pilot aperture 44, increasing the diameter of the aperture 44. At step 52, a chamfer is formed between the hat outer diameter surface 34 and the wheel mounting surface 28. At step 54, a chamfer is formed between the outer surface 56 of the outboard plate 36 and the outer diameter surface 58 of the outboard plate 36. At step 60, the outer diameter surface 58 is finished. At step 62, the outer diameter surface 64 of the inboard plate 38 is finished. At step 66, a chamfer is formed between the outer diameter surface 64 and the outer surface 68 of the inboard plate 38. The process steps 48, 50, 52, 54, 60, 62 and 66 can be performed by a first cutting tool.

The process continues to step 70 and the outer surfaces 56, 68 are processed with a rough straddle tool. The surfaces 56, 68 can be processed concurrently.

The process continues to step 72 and the hat outer diameter surface 34 is finished. At step 74, a step or notch (not shown) is formed in the outer surface 56. At step 76, the wheel mounting surface 28 is finished. Step 72, 74 and 76 can be completed by a second cutting tool.

The process continues to step 78 and the pilot aperture 44 is finished. At step 80 the surfaces 56, 68 are finished. The surfaces 56, 68 can be finished with a hydraulic, finishing straddle tool. At step 82, the bearing mounting surface 30 is finished. The process ends at step 84.

In the exemplary embodiment of the invention, steps 46, 48, 50, 52, 54, 60, 62, 66, 70, 72, 74, 76, 78, 80, 82, and 84 are performed at a single workstation while the rotor 10 is engaged with tooling 12. The steps 46-84 are performed while the jaws 20, and associated inserts 22, engage the as-cast hat inner diameter surface 32. After steps 46-84 are performed, the hat inner diameter surface 32 remains as-cast and the rotor 10 can be assembled to a vehicle if desired.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method comprising the steps of:
   fixedly securing a brake rotor with a first rotatable fixture;
   rough-cutting a plurality of surfaces of the brake rotor while the brake rotor is fixedly secured to the first rotatable fixture; and
   finishing the plurality of surfaces while the brake rotor is fixedly secured to the first rotatable fixture;
   wherein said rough-cutting step includes the steps of:
   rough-cutting a pilot aperture formed by the brake rotor to increase a diameter of the pilot aperture with a first cutting tool while the brake rotor is fixedly secured to the first rotatable fixture; and
   rough-cutting at least one of first and second outer surfaces formed by the brake rotor with a rough straddle tool while the brake rotor is fixedly secured to the first rotatable fixture.

2. A method comprising the steps of:
   fixedly securing a brake rotor with a first rotatable fixture;
   rough-cutting a plurality of surfaces of the brake rotor while the brake rotor is fixedly secured to the first rotatable fixture; and
   finishing the plurality of surfaces while the brake rotor is fixedly secured to the first rotatable fixture;
   wherein said finishing step includes the steps of:
   finishing a first outer diameter surface of an outboard plate of the brake rotor with a first cutting tool while the brake rotor is fixedly secured to the first rotatable fixture;
   finishing a second outer diameter surface of an inboard plate of the brake rotor with the first cutting tool while the brake rotor is fixedly secured to the first rotatable fixture;
   finishing a hat outer diameter surface of the brake rotor with a second cutting tool while the brake rotor is fixedly secured to the first rotatable fixture;
   finishing a wheel mounting surface of the brake rotor with the second cutting tool while the brake rotor is fixedly secured to the first rotatable fixture;
   finishing a pilot aperture of the brake rotor with a third cutting tool while the brake rotor is fixedly secured to the first rotatable fixture;
   finishing first and second outer surfaces of the brake rotor with a finishing straddle tool while the brake rotor is fixedly secured to the first rotatable fixture; and
   finishing a bearing mounting surface of the brake rotor with a fourth cutting tool while the brake rotor is fixedly secured to the first rotatable fixture.

3. A method comprising the steps of:
   fixedly securing a brake rotor with a first rotatable fixture, the brake rotor having a hat with a pilot aperture and a wheel mounting surface and a hat outer diameter surface and a hat inner diameter surface, the brake rotor also having an outboard plate with a first outer surface and a first outer diameter surface, the brake rotor also having an inboard plate with a second outer surface and a second outer diameter surface;
   forming a chamfer between the pilot aperture and the wheel mounting surface with a first cutting tool while the brake rotor is fixedly secured to the first rotatable fixture;
   rough-cutting the pilot aperture to increase the diameter of the pilot aperture with the first cutting tool while the brake rotor is fixedly secured to the first rotatable fixture;
   forming a second chamfer between the hat outer diameter surface and the wheel mounting surface with the first cutting tool while the brake rotor is fixedly secured to the first rotatable fixture;
   forming a third chamfer between the first outer surface and the first outer diameter surface of the outboard plate with the first cutting tool while the brake rotor is fixedly secured to the first rotatable fixture;
   finishing the first outer diameter surface of the outboard plate with the first cutting tool while the brake rotor is fixedly secured to the first rotatable fixture;
   finishing the second outer diameter surface with the first cutting tool while the brake rotor is fixedly secured to the first rotatable fixture;
   forming a chamfer between the second outer diameter surface and the second outer surface with the first cutting tool while the brake rotor is fixedly secured to the first rotatable fixture;
   concurrently rough-cutting the first and second outer surfaces with a rough straddle tool while the brake rotor is fixedly secured to the first rotatable fixture;
   finishing the hat outer diameter surface with a second cutting tool while the brake rotor is fixedly secured to the first rotatable fixture;
   finishing the wheel mounting surface with the second cutting tool while the brake rotor is fixedly secured to the first rotatable fixture;
   finishing the pilot aperture with a third cutting tool while the brake rotor is fixedly secured to the first rotatable fixture;
   finishing the first and second outer surfaces with a finishing straddle tool while the brake rotor is fixedly secured to the first rotatable fixture; and
   finishing the bearing mounting surface with a fourth cutting tool while the brake rotor (10) is fixedly secured to the first rotatable fixture.

* * * * *